United States Patent
Lee et al.

(10) Patent No.: US 8,371,982 B2
(45) Date of Patent: Feb. 12, 2013

(54) MULTI-SPEED TRANSMISSION WITH AT LEAST ONE SELECTABLE ONE-WAY CLUTCH

(75) Inventors: Chunhao J. Lee, Troy, MI (US); Farzad Samie, Franklin, MI (US); Larry D. Diemer, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 94 days.

(21) Appl. No.: 13/112,010

(22) Filed: May 20, 2011

(65) Prior Publication Data

US 2012/0295756 A1 Nov. 22, 2012

(51) Int. Cl.
*F16H 3/62* (2006.01)
*F16H 3/44* (2006.01)

(52) U.S. Cl. .................................. 475/277; 475/283
(58) Field of Classification Search .................. 475/277, 475/282, 283, 289, 297, 903
See application file for complete search history.

(56) References Cited

U.S. PATENT DOCUMENTS

| | | | | |
|---|---|---|---|---|
| 5,167,592 A | * | 12/1992 | Sakamoto | 475/277 |
| 7,179,192 B2 | * | 2/2007 | Park | 475/277 |
| 7,699,736 B2 | * | 4/2010 | Diosi et al. | 475/5 |
| 2011/0009229 A1 | | 1/2011 | Bauknecht et al. | |

* cited by examiner

*Primary Examiner* — Edwin A Young
(74) *Attorney, Agent, or Firm* — Quinn Law Group, PLLC

(57) ABSTRACT

A transmission has four planetary gear sets, four interconnecting members and six torque-transmitting mechanisms selectively engageable in different combinations of three to establish at least eight forward speed ratios. A first of the six torque-transmitting mechanisms is selectively engageable to connect the second member of the first planetary gear set to the stationary member. A second of the six torque-transmitting mechanisms is selectively engageable to connect the input member for common rotation with the second member of the third planetary gear set. At least one of the first and the second of the six torque-transmitting mechanisms is a selectable one-way clutch configured to have a first operating mode and a second operating mode, either of which modes may be selected.

20 Claims, 4 Drawing Sheets

| | 68 | 60 | 62 | 63 | 64 | 66 |
|---|---|---|---|---|---|---|
| 82 | ← → | | | X | X | |
| | 0  0 | | | 0 | | |
| 1 | → ← | X | | X | | |
| 2 | → ← | X | X | | | |
| 3 | → ← | X | | | X | |
| 4 | → ← | X | | | | X |
| 5 | --→ − | X | | | X | X |
| 6 | --→ − | X | X | | | X |
| 7 | --→ − | X | | X | | X |
| 8 | --→ − | | X | X | | X |
| 9 | --→ − | | | X | X | X |

|   | 61 | 168 | 62 | 63 | 64 | 66 |
|---|----|-----|----|----|----|----|
| 82 | X | ---> | – |   | X | X |   |
|   | 0 |   |   |   | 0 |   |   |
| 1 | X | ← | → |   | X |   |   |
| 2 | X | ← | → | X |   |   |   |
| 3 | X | ← | → |   |   | X |   |
| 4 | X | ← | → |   |   |   | X |
| 5 |   | → | ← |   |   | X | X |
| 6 |   | → | ← | X |   |   | X |
| 7 |   | → | ← |   | X |   | X |
| 8 |   | ---> | – | X | X |   | X |
| 9 |   | ---> | – |   | X | X | X |

| | 68 | 168 | 62 | 63 | 64 | 66 |
|---|---|---|---|---|---|---|
| R | ← → | ---> | – | | X | X | |
| | 0 0 | | | | 0 | | |
| 1 | → ← | ← | → | | X | | |
| 2 | → ← | ← | → | X | | | |
| 3 | → ← | ← | → | | | X | |
| 4 | → ← | ← | → | | | | X |
| 5 | ---> | – | → | ← | | | X | X |
| 6 | ---> | – | → | ← | X | | | X |
| 7 | ---> | – | → | ← | | X | | X |
| 8 | ---> | – | ---> | – | X | X | | X |
| 9 | ---> | – | ---> | – | | X | X | X |

# MULTI-SPEED TRANSMISSION WITH AT LEAST ONE SELECTABLE ONE-WAY CLUTCH

TECHNICAL FIELD

The invention relates to a multi-speed transmission with one or more selectable one-way clutches.

BACKGROUND

Automatic, multi-speed transmissions that incorporate planetary gear sets typically include multiple friction plate-type clutches in order to manipulate the transmission to provide many forward speed ratios. Many such components are necessary to provide six, seven, or eight forward speed ratios. The planetary gear sets and clutches become increasingly difficult to package as they increase in number, and also add to the overall weight of the transmission. Additionally, the control system becomes increasingly complex as the number of friction plate clutches increases.

As is commonly known to those familiar with the art, disengaged multi-plate friction clutches, depending on various conditions, produce drag when there is relative motion between the sets of clutch plates. One characteristic of a disengaged multi-plate clutch is that, as the relative speed between the sets of clutch plates increases, typically, so does the drag or spin loss. This spin loss contributes to decreased fuel economy.

SUMMARY

A transmission for a vehicle is provided that has an input member, an output member, and a stationary member, such as the transmission housing. The transmission has a first, a second, a third, and a fourth planetary gear set. Each planetary gear set has a first, a second, and a third member. The output member is connected for common rotation with the first member of the first planetary gear set. A first interconnecting member continuously connects the second member of the first planetary gear set for common rotation with the first member of the second planetary gear set. A second interconnecting member continuously connects the third member of the first planetary gear set for common rotation with the second member of the second planetary gear set. A third interconnecting member continuously connects the third member of the second planetary gear set for common rotation with the first member of the third planetary gear set and the first member of the fourth planetary gear set. A fourth interconnecting member continuously connects the second member of the third planetary gear set for common rotation with the second member of the fourth planetary gear set.

The transmission has six torque-transmitting mechanisms each of which is selectively engageable to connect a respective one of the members of the planetary gear sets with the input member, the stationary member, or with another respective one of the members of the planetary gear sets. A first of the six torque-transmitting mechanisms is selectively engageable to connect the second member of the first planetary gear set to the stationary member. A second of the six torque-transmitting mechanisms is selectively engageable to connect the input member for common rotation with the second member of the third planetary gear set. The six torque-transmitting mechanisms are engaged in different combinations of three to establish at least eight forward speed ratios and a reverse speed ratio between the input member and the output member.

At least one of the first and the second of the six torque-transmitting mechanisms is a selectable one-way clutch configured to have a first operating mode and a second operating mode, either of which modes may be selected. In the first operating mode, the selectable one-way clutch engages when relative rotation of a first portion of the selectable one-way clutch to a second portion of the selectable one-way clutch is in a first direction and freewheels when relative rotation of the first portion of the selectable one-way clutch to the second portion of the selectable one-way clutch is in an opposing second direction. As used herein, "relative rotation" means the difference in the speed of rotation of the first portion and the speed of rotation of the second portion. In the second operating mode, the selectable one-way clutch engages when relative rotation of the first portion of the selectable one-way clutch to the second portion of the selectable one-way clutch is in the second direction of rotation and freewheels when relative rotation of the first portion of the selectable one-way clutch to the second portion of the selectable one-way clutch is in the first direction of rotation.

The use of one or more selectable one-way clutches in the transmission simplifies the clutch control system in comparison to the use of friction plate clutches or dog clutches, as the one-way clutch engages automatically engages mechanically (without hydraulic pressure) once it is placed in the designated first or second mode. Spin losses are reduced in comparison to friction plate and dog clutches. Hydraulic supply is not required to maintain an engaged state. Furthermore, in some speed ratios, a glide mode will result when the vehicle operator releases pressure on the accelerator and places little or no pressure on the brakes. In the glide mode, the engine is disconnected from the vehicle wheels. Coasting is smooth, and the engine speed can be reduced to an idle speed, improving fuel efficiently.

The above features and advantages and other features and advantages of the present invention are readily apparent from the following detailed description of the best modes for carrying out the invention when taken in connection with the accompanying drawings.

DETAILED DESCRIPTION

Figures 1, 2:
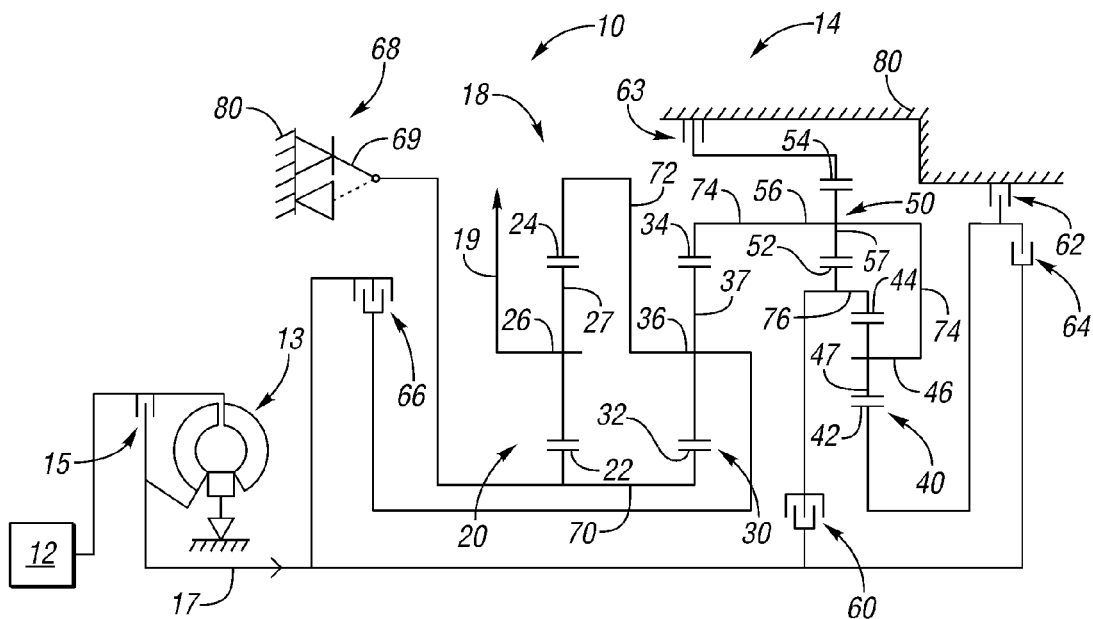
FIG. 1 is a schematic illustration of a first embodiment of a powertrain having an engine and a transmission with an SOWC.
FIG. 2 is an engagement schedule for torque-transmitting mechanisms of the transmission of FIG. 1.

Referring to the drawings, wherein like reference numbers refer to like components throughout the several views, FIG. 1 schematically illustrates an exemplary powertrain 10 that includes an engine 12 and a planetary transmission 14. The planetary transmission 14 includes an input member 17 operatively connected with the engine 12, a planetary gear arrangement 18, and an output member 19 continuously connected with a final drive mechanism, not shown. A torque converter 13 with a lockup clutch 15 may be positioned between the engine 12 and the input member 17. The lockup clutch 15 may be engaged when operating conditions warrant a direction connection between the engine 12 and the input member 17. If no torque converter is present, then an isolator may be positioned between the engine 12 and the input member 17. The planetary gear arrangement 18 includes four planetary gear sets 20, 30, 40 and 50.

The first planetary gear set 20 includes a sun gear member 22, a carrier member 26, and a ring gear member 24. The carrier member 26 rotatably supports a set of pinion gears 27 that mesh with both the sun gear member 22 and the ring gear member 24.

The second planetary gear set 30 includes a sun gear member 32, a ring gear member 34, and a carrier member 36 that rotatably supports a set of pinion gears 37 that mesh with both the sun gear member 32 and with the ring gear member 34.

The third planetary gear set 40 includes a sun gear member 42, a ring gear member 44, and a carrier member 46 that rotatably supports a set of pinion gears 47 that mesh with both the sun gear member 42 and with the ring gear member 44.

The fourth planetary gear set 50 includes a sun gear member 52, a ring gear member 54, and a carrier member 56 that rotatably supports a set of pinion gears 57 that mesh with both the sun gear member 52 and with the ring gear member 54.

As used herein, the first member of the first planetary gear set 20 is carrier member 26, the second member of the first planetary gear set 20 is sun gear member 22, and the third member of first planetary gear set 20 is ring gear member 24. The first member of the second planetary gear set 30 is sun gear member 32, the second member of the second planetary gear set 30 is carrier member 36, and the third member of the second planetary gear set 30 is ring gear member 34. The first member of the third planetary gear set 40 is carrier member 46, the second member of the third planetary gear set 40 is ring gear member 44, and the third member of the third planetary gear set 40 is sun gear member 42. The first member of the fourth planetary gear set 50 is carrier member 56, the second member of the fourth planetary gear set 50 is sun gear member 52, and the third member of the fourth planetary gear set 50 is ring gear member 54.

The transmission 14 also includes six torque-transmitting mechanisms 60, 62, 63, 64, 66 and 68. The torque-transmitting mechanisms 60, 64 and 66 are rotating-type torque-transmitting mechanisms, commonly termed clutches. Clutches 60, 64 and 66 are multi-plate friction clutch devices. The torque-transmitting mechanisms 62 and 63 are stationary-type torque-transmitting mechanisms, commonly termed brakes or reaction clutches. The torque-transmitting mechanism 68 is a selectable one-way clutch SOWC, which in this embodiment is a selectable one-way braking clutch, and is discussed in greater detail below with respect to FIGS. 3 and 4. SOWC 68 is referred to herein as the first torque-transmitting mechanism, torque-transmitting mechanism 60 is referred to herein as the second torque-transmitting mechanism, torque-transmitting mechanism 62 is referred to herein as the third torque-transmitting mechanism, torque-transmitting mechanism 63 is referred to herein as the fourth torque-transmitting mechanism, torque-transmitting mechanism 64 is referred to herein as the fifth torque-transmitting mechanism, and torque-transmitting mechanism 66 is referred to herein as the sixth torque-transmitting mechanism.

A first interconnecting member 70 continuously connects sun gear member 22 for common rotation with sun gear member 32. A second interconnecting member 72 continuously connects ring gear member 24 for common rotation with carrier member 36. A third interconnecting member 74 continuously connects ring gear member 34 for common rotation with carrier member 56 and the carrier member 46. A fourth interconnecting member 76 continuously connects sun gear member 52 for common rotation with ring gear member 44.

The input member 17 is not continuously connected for common rotation with any member. The output member 19 is continuously connected for common rotation with the carrier member 26. Sun gear member 22 is selectively grounded to the stationary member 80 by engagement of SOWC 68. The input member 17 is selectively connected for common rotation with the sun gear member 52 and the ring gear member 44 by engagement of torque-transmitting mechanism 60. Sun gear member 42 is selectively grounded to the stationary member 80 by engagement of clutch 62. Ring gear member 54 is selectively grounded to the stationary member 80 by engagement of torque-transmitting mechanism 63. The input member 17 is selectively connected for common rotation with the sun gear member 42 by engagement of torque-transmitting mechanism 64. The input member 17 is selectively connected for common rotation with the carrier member 36 by engagement of torque-transmitting mechanism 66.

FIG. 2 is a clutching table, describing operation of the torque-transmitting mechanisms of transmission 14 in various or speed ratios. In the table of FIG. 2, an "X" denotes an engaged clutch or brake. An "O" denotes that the torque-transmitting mechanism is engaged, but not holding torque, such as in a garage shift. Solid arrows also represent an engaged state, as described below. The torque-transmitting mechanisms 60, 62, 63, 64, 66 and 68 are selectively engaged in combinations of three to provide nine forward speed ratios 1st through 9th, denoted 1-9 in FIG. 2, and a reverse speed ratio R, denoted 82 in FIG. 2, between the input member 17 and the output member 19. Exemplary ring gear member to sun gear member tooth ratios of the planetary gear sets are: ring gear member to sun gear member tooth ratio of planetary gear set 20 is 2.70; ring gear member to sun gear member tooth ratio of planetary gear set 30 is 2.70; ring gear member to sun gear member tooth ratio of planetary gear set 40 is 1.9; and ring gear member to sun gear tooth ratio of the planetary gear set 50 is 1.54. With these exemplary tooth ratios, the gear ratios (i.e., the torque of the output member 19 to the input member 17 is as follows: gear ratio in the reverse speed ratio is −3.617, gear ratio in the 1st forward speed ratio is 4.770, gear ratio in the 2nd forward speed ratio is 2.886, gear ratio in the 3rd forward speed ratio is 1.878, gear ratio in the 4th forward speed ratio is 1.370, gear ratio in the 5th forward speed ratio is 1.000, gear ratio in the 6th forward speed ratio is 0.799, gear ratio in the 7th forward speed ratio is 0.693, gear ratio in the 8th forward speed ratio is 0.578, and gear ratio in the 9th forward speed ratio is 0.474. Nine different forward speed ratios (the ratio of speed of the input member to the speed of the output member) correspond with the nine different gear ratios in the forward speed ratios.

With respect to the SOWC 68 in FIG. 2, the column on the left indicates the operating modes of the SOWC 68 selected for forward or reverse propulsion of a vehicle with powertrain 10 without engine braking. The column on the right indicates the operating modes of the SOWC selected for engine braking. Referring to the column on the left, a first operating mode of the SOWC 68 is selected in the 1st through 9th forward speed ratios. In the first operating mode, the solid arrow pointing to the right indicates that the SOWC 68 engages in the 1st through 4th forward speed ratios when the sun gear members 22 and 32 rotate in a forward direction of rotation. A forward direction of rotation is the direction of rotation of the input member 17 in a forward speed ratio. As used herein "a first direction" is the forward direction of rotation and "a second direction" is the reverse direction of rotation. The dashed arrows corresponding with the 5th through 9th forward speed ratios indicates that the SOWC 68 freewheels in the first operating mode when the sun gear members 22 and 32 rotate in a reverse direction of rotation. Thus, in the first operating mode, the SOWC 68 provides reaction torque in the 1st through 4th forward speed ratios and freewheels in the 5th through 9th forward speed ratios while staying in the first or forward operating mode. In the reverse speed ratio R 82, the solid arrow pointing to the left indicates that a second operating mode of the SOWC 68 is selected in which the SOWC 68 engages when the sun gear members 22, 32 rotate in a reverse direction of rotation and freewheels when the sun gear members 22, 32 rotate in a forward direction of rotation. The shift from the 4th to the 5th forward speed ratio is a freewheeling shift.

The column on the right below the SOWC 68 in FIG. 2 indicates the operating modes selected for the SOWC 68 when engine braking is desired. The second operating mode is selected in the 1st through 4th forward speed ratios. Thus, in the second operating mode, the SOWC 68 provides reaction torque for engine braking in the 1st through 4th forward speed ratios. The mode of the SOWC 68 does not affect engine braking in the 5th through 9th forward speed ratios, so dashes are shown in FIG. 2 in those speed ratios.

The SOWC 68 is shown schematically in FIG. 1, with a switch element 69 selected to the first operating mode, which is a forward braking position. This operating mode causes the transmission housing 80 to provide reaction torque and prevents rotation of the sun gear members 22, 32 in the forward direction, but allows the sun gear members 22, 32 to freewheel in a reverse direction of rotation. The switch element 69 is selectively movable to the second operating mode, the reverse braking position, shown with dashed lines. In the reverse braking position, the SOWBC 68 will freewheel to allow the sun gear members 22, 32 to rotate in the forward direction and provides reaction torque and prevents rotation of the sun gear members 22, 32 in a reverse direction of rotation.

Figure 3:
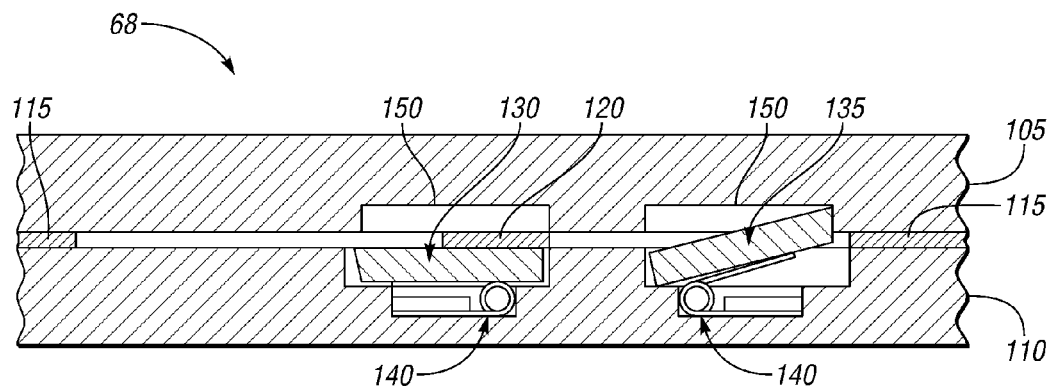
FIG. 3 is a schematic cross-sectional fragmentary illustration of an SOWC of FIGS. 1, 5 and 7 in a first operating mode.
Figure 4:
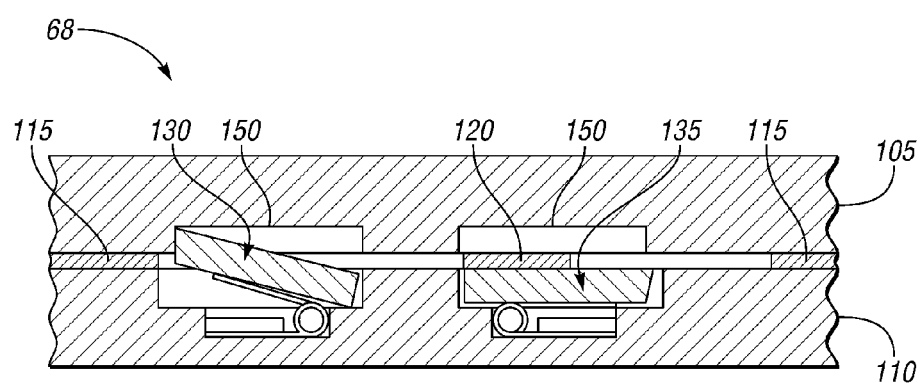
FIG. 4 is a schematic cross-sectional fragmentary illustration of the SOWC of FIG. 3 in a second operating mode.

The first operating mode of the SOWC 68 is shown in FIG. 3 and the second operating mode of the SOWC 68 is shown in FIG. 4. The first member 105 is an outer race of the SOWC 68. In the embodiment of FIG. 1, the first member 105 is splined to the transmission housing 80. The second member 110 is an inner race of the SOWC 68. In the embodiment of FIG. 1, the second member 110 is splined to the hub that rotates with the sun gear members 22, 32. The second member 110 is referred to as a first portion of the SOWC 68 and the first member 105 is referred to as a second portion of the SOWC 68. A snap ring may be used to keep the SOWC 68 in place.

The SOWC 68 may be a controllable mechanical diode clutch, a selectable roller clutch design, or another selectable (reversible) one-way clutch design. The SOWC 68 may be hydraulically actuated by a piston and a valve. A number of clutch designs capable of functioning as an SOWC are envisioned, and this disclosure is not intended to be limited to the particular exemplary embodiments described herein.

Several methods are known to implement an SOWC. Struts, rockers, rollers, or sprags are different features that can be utilized to selectively couple or decouple the members of the clutch. FIGS. 3 and 4 illustrate in cross-section the SOWC 68 selecting between the first operating mode (forward-locked and reverse-freewheeling operation (FIG. 3)) and the second operating mode (reverse-locked, forward freewheeling operation (FIG. 4)), in accordance with the present disclosure. The SOWC 68 comprises the first member 105, the second member 110, a selector plate 115, a selector plate actuation feature 120, a first engagement element 130, a second engagement element 135, two return springs 140, and two engagement features 150. The second member 110 and the selector plate 115 can be rotatable features centered around a common axis of rotation (not shown, but established by the input member 17 of FIG. 1). The members 105 and 110 may be flat circular plates. Selector plate 115 is sandwiched between the two members and generally moves or remains fixed with second member 110. Selector plate 115 includes selector plate actuation feature 120. Selector plate 115 is movable relative to first member 105 by some small rotational angle, so as to provide calibrated movement of selector plate actuation feature 120. Engaging elements 130 and 135, illustrated as struts in this exemplary embodiment, are rotatingly located to second member 110, are oriented substantially normally to the radius of the second member 110, and provide the selective coupling and decoupling functions served by the SOWC 68. Each engaging element 130, 135, when in an up position, fixedly fits against an engagement feature 150 in first member 105 and prevents second member 110 from rotating relative to first member 105 in one direction. The engagement elements 130, 135 are normally in an up position due to forces exerted by return springs 140. Selector plate 115 can be actuated relative to the engaging elements 130, 135, such that selector plate actuation feature 120 can be used to depress one of the engagement elements 130, 135 into a down position. The action of the engagement to stop relative rotation depends upon the geometry of the interacting features. If one of the engagement elements 130, 135 is in a down position, then the clutch can freewheel in the direction normally prohibited by the engagement feature in the down position.

FIG. 3 illustrates SOWC 68 with one engagement element in a down position and one engagement element in an up position. Engagement element 135 is in an up position and is fit against an engagement feature 150. As a result, second member 110 cannot rotate to the right relative to first member 105. However, engagement element 130 is in a down position. Engagement feature 135 provides substantially zero resistance to second member 110 rotating to the left relative to first member 105. When relative rotation occurs and first member 105 comes into contact with engagement element 135, pressure upon the top, nearly horizontal surface of engagement element 135 creates a downward rotation of engagement element 135. This ratcheting motion of engagement element 135 can continue as engagement element 135 rotates past subsequent engagement features 150. The state of the SOWC 68 in FIG. 3 is consistent with the switch 69 selecting the first operating mode, preventing forward rotation of the second member 110 (i.e., rotation to the right in FIG. 3), and thus sun gear members 22, 32, but allowing second member 110 and thus sun gear members 22, 32 to freewheel in a reverse direction of rotation (i.e., rotation to the left in FIG. 3).

FIG. 4 illustrates SOWC 68 with engagement element 130 in an up position and engagement element 135 in a down position. Selector plate 115 is actuated relative to the engagement elements such that engagement element 135 is depressed by actuation feature 120 and engagement element 130 is not depressed. As a result, rotation of second member 110 in a direction to the left (the reverse direction) relative to first member 105 is not possible. The second member 110 can freewheel in a direction to the right (forward rotation). The state of the SOWC 68 in FIG. 4 is consistent with the switch 69 selecting the second operating mode, preventing reverse rotation of the second member 110, and thus sun gear members 22, 32, and allowing freewheeling of the sun gear members 22, 32 in the forward direction of rotation.

It will be appreciated that the members of an SOWC are likely to have a plurality of features 130, 135 like SOWC 68, each actuated similarly to allow or prevent rotation in either direction, with the total torque transmitted through the SOWC distributed between the SOWC features 130, 135. When features 135 are in the up position and features 130 are in the down position, the SOWC 68 is in a forward one-way clutch mode (F-OWC), the first mode described above. When features 130 are in the up position and features 135 are in the down position, the SOWC 68 is in a reverse one-way clutch mode (R-OWC), the second mode described above. When both sets of features 130, 135 are in the up position, the SOWC 68 is in a lock-lock mode, as rotation is prevented in both directions. When both sets of features 130, 135 are in the down position, the SOWC 68 is in a neutral mode as the clutch can freewheel in both directions of rotation. Similar SOWC features are known in the art for a rocker mechanism with a pair of engagement elements located at distal ends of the rocker, capable similarly of preventing or enabling relative rotation, in combination with engagement features on an opposing member, based upon rocking actuation of the rocker. Rollers or sprags can alternatively be used in members located one radially inside the other, with a gap between the members. The rollers or sprags can be actuated to interact within the gap to selectively couple the members in one or both directions of rotation.

Application of an SOWC, as described above, to an automatic transmission can reduce parts and increase fuel efficiency. Yet, when the SOWC 68 needs to be engaged, slip across the clutch must substantially equal zero. There can be no relative rotation (i.e., slip) between the members 105, 110; that is, both members 105, 110 of the SOWC 68 need to be stationary or, in an embodiment where neither is grounded, need to be rotating at the same speed and in the same direction.

In the embodiment of FIG. 1, the SOWC 68 allows a glide mode in which smooth coasting of a vehicle can occur during the 1st to the 4th forward speed ratios. Coasting will occur when the vehicle operator releases the accelerator and puts little or no pressure on the vehicle brakes. Under these conditions, the speed of the input member 17 decreases, causing torque through the transmission 14 to place a reverse torque on the sun gear members 22, 32. Because the SOWC 68 is in the first operating mode, the SOWC 68 will overrun. No torque will be transmitted from the input member 17 to the output member 19. The engine 12 is thus disconnected from the vehicle wheels. The speed of the engine 12 can decrease to an engine idle speed, increasing fuel economy. The speed of the output member 19, and thus of the wheels, can smoothly coast downward without the engine 12 connected to the output member 19. This assumes that the engine 12 is not controlled to automatically cut off fuel supply during deceleration.

Figures 5, 6:
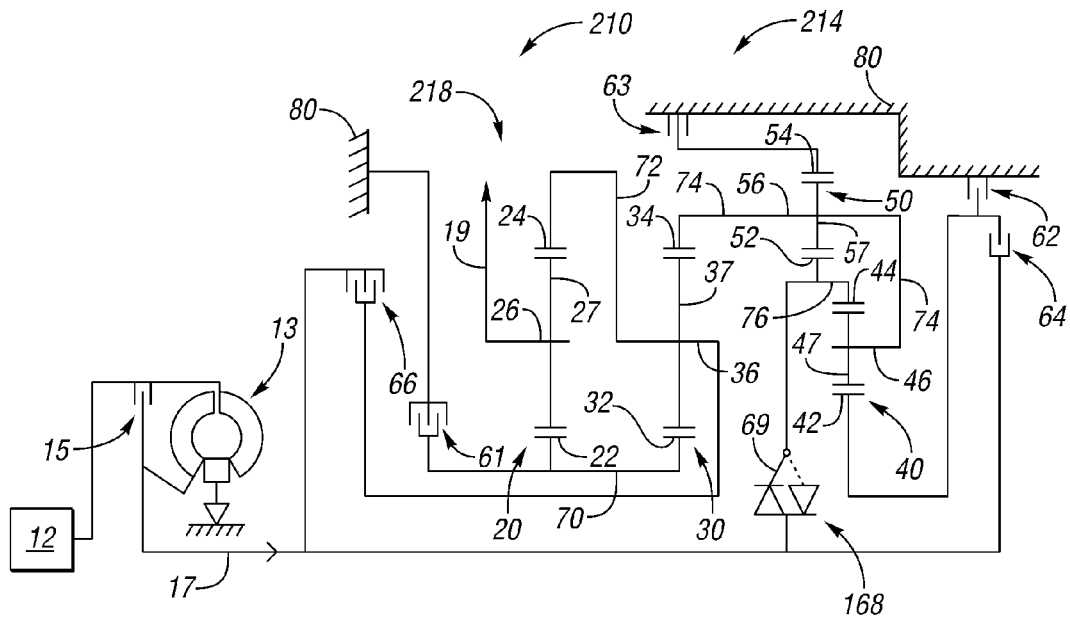
FIG. 5 is a schematic illustration of a second embodiment of a powertrain having an engine and a transmission.
FIG. 6 is an engagement schedule for torque-transmitting mechanisms of the transmission of FIG. 5.

Referring to FIG. 5, a second embodiment of a powertrain 210 having a transmission 214 and a planetary gearing arrangement 218 is shown. The powertrain 210 is alike in all aspects to the powertrain 10 of FIG. 1 except that a SOWC 168 is used in place of torque-transmitting mechanism 60, and a conventional friction plate brake 61 is used to ground the sun gear members 22, 32 to the stationary member 80. In this embodiment, the SOWC 168 is a rotating-type SOWC, rather than a braking-type SOWC. Accordingly, the SOWC 168 is represented by the elements and description of the SOWC 68 of FIGS. 3 and 4, except that the first member 105 rotates at the same speed as the input member 17 and the second member 110 rotates at the same speed as the sun gear member 52 and the ring gear member 44.

With respect to the SOWC 168 in FIG. 6, the column on the left indicates the operating modes of the SOWC 168 selected for forward or reverse propulsion without engine braking. The second operating mode is selected in the 1st through 4th forward speed ratios 1-4. In the second operating mode, the arrow to the left in FIG. 6 indicates that the SOWC 168 engages when the input member 17 rotates in a forward direction of rotation faster than the sun gear member 52 and ring gear member 44. That is, the relative rotation of the sun gear member 52 (the first portion of SOWC 168 (second member 110 of FIG. 4)) and the input member 17 (second portion of SOWC 168 (first member 105 of FIG. 4) is in the second direction. Thus, the SOWC 168 will be engaged in the 1st through 4th forward speed ratios, but not in the reverse R 82 speed ratio.

A glide mode is available in the 1st through 4th forward speed ratios. In the glide mode, smooth coasting of a vehicle will occur when the vehicle operator releases the accelerator and puts little or no pressure on the vehicle brakes. Under these conditions, the speed of the input member 17 decreases and because the SOWC 168 is in the second operating mode, the SOWC 168 will overrun. No torque will be transmitted from the input member 17 to the output member 19. The engine 12 is thus disconnected from the vehicle wheels. The speed of the engine 12 can decrease to an engine idle speed, increasing fuel economy. The speed of the output member 19, and thus of the wheels, can smoothly coast downward without the engine 12 connected to the output member 19. This assumes that the engine 12 is not controlled to automatically cut off fuel supply during deceleration.

The first operating mode of the SOWC 168 is selected in the 5th through 7th forward speed ratios 5-7. In the first operating mode, the arrow pointing to the right indicates that the SOWC 168 engages in the 5th through 7th forward speed ratios when the sun gear member 52 and ring gear member 44 rotate faster than the input member 17, with the input member 17 rotating in a forward direction of rotation. That is, the relative direction of rotation of the sun gear member 52 (first portion of SOWC 168 (second member 110 of FIG. 3)) and the input member 17 (second portion of SOWC 168 (first member 105 of FIG. 3) is in a first direction. A forward direction of rotation is the direction of rotation of the input member 17 in a forward gear. Thus, the SOWC 168 will also be engaged in the 5th through 7th forward speed ratios.

The SOWC 168 is the first operating mode in the reverse R 82 and the 8th through 9th forward speed ratios. The dashed arrow indicates that the SOWC 168 freewheels in the first operating mode when the sun gear member 52 and ring gear member 44 again are caused by the engagement schedule to rotate slower than the input member 17. The shift from the 7th to the 8th forward speed ratio is a freewheeling shift.

The column on the right below the SOWC 168 in FIG. 6 indicates the operating modes selected for the SOWC 168 when engine braking is desired. The first operating mode is selected in the 1st through 4th forward speed ratios. Thus, in the first operating mode, the SOWC 168 provides reaction torque for engine braking in the 1st through 4th forward speed ratios. The second operating mode is selected in the 5th through 7th forward speed ratios in order for the SOWC 168 to provide reaction torque. The mode of the SOWC 168 does not affect engine braking in the reverse R 82 or the 8th through 9th forward speed ratios, so dashes are shown in FIG. 6 in those speed ratios.

Figures 7, 8:
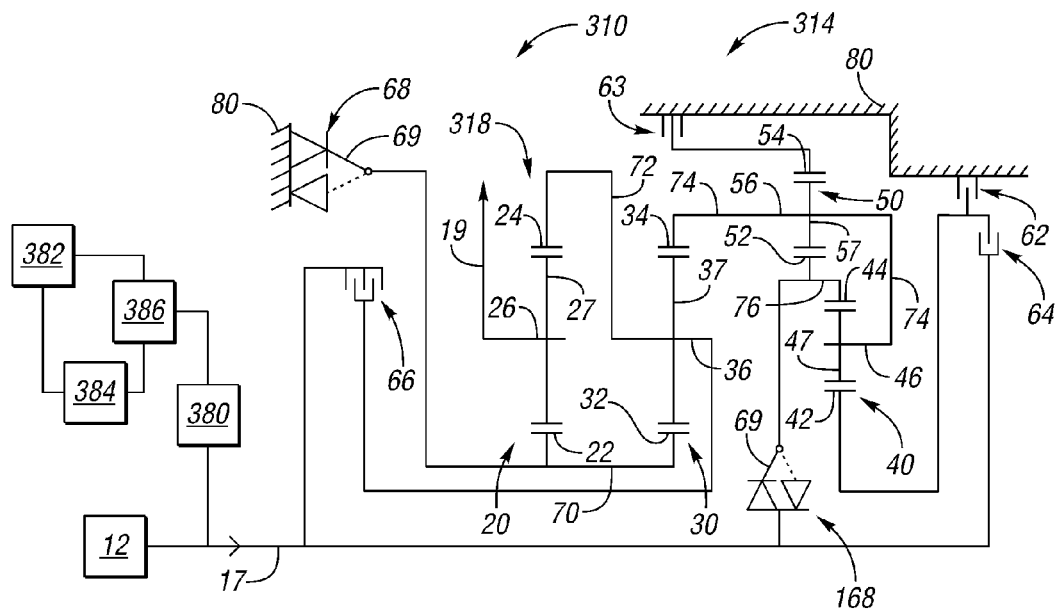
FIG. 7 is a schematic illustration of a third embodiment of a powertrain having an engine and a transmission.
FIG. 8 is an engagement schedule for torque-transmitting mechanisms of the transmission of FIG. 7.

Referring to FIG. 7, another embodiment of a powertrain 310 with a transmission 314 and a planetary gear arrangement 318 is shown. The transmission 314 is identical to the transmissions 14 and 214 except that both the SOWC 68 and the SOWC 168 are used. Additionally, a motor/generator 380 is connected for rotation with the input member 17 and with a crankshaft or other output member of the engine 12. The motor/generator 380 receives power from or provides power to an energy storage device 382 through a power inverter 386 under the control of a controller 384.

The SOWC 68 and the SOWC 168 are controlled to operate according to the operating modes described with respect to FIGS. 1 and 5 and the engagement schedules of FIG. 8. The motor/generator 380 is used to stop and start the engine 12. The powertrain 310 may be referred to as an engine start-stop hybrid powertrain. Because both the SOWC 68 and the SOWC 168 are used, under conditions when the engine 12 is spinning and the SOWC 168 is overrunning, there is no plate clutch that may be engaged to stop the engine 12 and input member 17. The input member 17 must be at a stop to engage the SOWC 168 when the output member 19 is stopped, as the SOWC 168 can only be engaged when the speed of the input member 17 is synchronous with the speed of the sun gear member 52 and ring gear member 44 (zero speed). Accordingly, the motor/generator 380 is controlled to apply torque to stop the engine 12 and input member 17 and to restart the engine 12 and rotate the input member 17, such as at a traffic light. Other hybrid transmission arrangements having one or more motor/generators operable to stop the input member 17 may also be used. Additionally, the transmissions 10, 210 of FIGS. 1 and 5 may be hybrid transmissions. In another embodiment, the transmission 314 may be used without a motor/generator 380. Torque-transmitting mechanisms 62 and 63 can be engaged and the SOWC 68 placed in the second mode to cause the input member 17 to reduce to zero speed, after which the SOWC 168 can be placed in the first mode to engage. Alternately, torque-transmitting mechanisms 62, 63 and 64 can be engaged to cause the input member 17 to reduce to zero speed and then SOWC 168 placed in the first mode to engage.

While the best modes for carrying out the invention have been described in detail, those familiar with the art to which this invention relates will recognize various alternative designs and embodiments for practicing the invention within the scope of the appended claims.

The invention claimed is:

1. A transmission for a vehicle comprising:
an input member;
an output member;
a stationary member;
a first, a second, a third, and a fourth planetary gear set, each planetary gear set having a first, a second, and a third member; wherein the output member is connected for common rotation with the first member of the first planetary gear set;
a first interconnecting member continuously connecting the second member of the first planetary gear set for common rotation with the first member of the second planetary gear set;
a second interconnecting member continuously connecting the third member of the first planetary gear set for common rotation with the second member of the second planetary gear set;
a third interconnecting member continuously connecting the third member of the second planetary gear set for common rotation with the first member of the third planetary gear set and the first member of the fourth planetary gear set;
a fourth interconnecting member continuously connecting the second member of the third planetary gear set for common rotation with the second member of the fourth planetary gear set;
six torque-transmitting mechanisms each of which is selectively engageable to connect a respective one of the members of the planetary gear sets with one of the input member, the stationary member, and another respective one of the members of the planetary gear sets;
wherein a first of the six torque-transmitting mechanisms is selectively engageable to connect the second member of the first planetary gear set to the stationary member;
wherein a second of the six torque-transmitting mechanisms is selectively engageable to connect the input member for common rotation with the second member of the third planetary gear set;
wherein at least one of the first and the second of the six torque-transmitting mechanisms is a selectable one-way clutch configured to have at least a first operating mode and a second operating mode, either of which modes may be selected; wherein the selectable one-way clutch engages when relative rotation of a first portion of the selectable one-way clutch to a second portion of the selectable one-way clutch is in a first direction in the first operating mode and freewheels when relative rotation of the first portion of the selectable one-way clutch to the second portion of the selectable one-way clutch is in an opposing second direction in the first operating mode; wherein the selectable one-way clutch engages when relative rotation of the first portion of the selectable one-way clutch to the second portion of the selectable one-way clutch is in the second direction of rotation in the second operating mode and freewheels when relative rotation of the first portion of the selectable one-way clutch to the second portion of the selectable one-way clutch in the first direction of rotation in the second operating mode; and
wherein the six torque-transmitting mechanisms are engaged in different combinations of three to establish at least eight forward speed ratios and a reverse speed ratio between the input member and the output member.

2. The transmission of claim 1 in combination with an engine operable for providing power to the input member; wherein the first of the six torque-transmitting mechanisms is the selectable one-way clutch; wherein the first operating mode is selected in at least some of said at least eight forward speed ratios; and wherein the selectable one-way clutch freewheels in said at least some of said at least eight forward speed ratios when speed of the input member is reduced, thereby preventing power flow from the input member to the output member and permitting speed of the engine to decrease independently of speed of the output member.

3. The transmission and engine of claim 2, wherein the engine reduces to an idle speed when the selectable one-way clutch freewheels in the first operating mode.

4. The transmission and engine of claim 2, wherein the engine is operable in an engine braking mode in which retarding forces in the engine slow the engine; wherein the selectable one-way clutch is in the second mode to permit power flow from the output member to the input member during engine braking mode in said at least some of said at least eight forward speed ratios.

5. The transmission and engine of claim 1, wherein the selectable one-way clutch is in the first mode to permit power flow from the input member to the output member during said reverse speed ratio.

6. The transmission of claim 1, wherein the selectable one-way clutch freewheels during a shift between at least two of said at least eight forward speed ratios.

7. The transmission of claim 1 in combination with an engine operable for providing power to the input member; wherein the second of the six torque-transmitting mechanisms is the selectable one-way clutch; wherein the second operating mode is selected in at least some of said at least eight forward speed ratios; and wherein the selectable one-way clutch freewheels in said at least some of said at least eight forward speed ratios when speed of the input member is reduced, thereby preventing power flow from the input member to the output member and permitting speed of the engine to decrease independently of speed of the output member.

8. The transmission and engine of claim 7, wherein the engine reduces to an idle speed when the selectable one-way clutch freewheels in the second operating mode.

9. The transmission and engine of claim 8, wherein the engine is operable in an engine braking mode in which retarding forces in the engine slow the engine; wherein the selectable one-way clutch is in the first operating mode to permit power flow from the output member to the input member during engine braking mode in said at least some of said at least eight forward speed ratios.

10. The transmission and engine of claim 9, wherein the selectable one-way clutch is in the first operating mode to permit power flow from the input member to the output member during the engine braking mode and in said reverse speed ratio.

11. The transmission of claim 7, wherein the selectable one way clutch freewheels during a shift between at least two of said at least eight forward speed ratios.

12. The transmission of claim 1, wherein a third of the six torque-transmitting mechanisms is selectively engageable to connect the third member of the third planetary gear set to the stationary member;
  wherein a fourth of the six torque-transmitting mechanisms is selectively engageable to connect the third member of the fourth planetary gear set to the stationary member;
  wherein a fifth of the six torque-transmitting mechanisms is selectively engageable to connect the input member for common rotation with the third member of the third planetary gear set; and
  wherein a sixth of the six torque-transmitting mechanisms is selectively engageable to connect the input member for common rotation with the second member of the second planetary gear set.

13. The transmission of claim 1, wherein the first member of the first planetary gear set is a carrier member, the second member of the first planetary gear set is a sun gear member, and the third member of the first planetary gear set is a ring gear member;
  wherein the first member of the second planetary gear set is a sun gear member, the second member of the second planetary gear set is a carrier member, and the third member of the second planetary gear set is a ring gear member;
  wherein the first member of the third planetary gear set is a carrier member, the second member of the third planetary gear set is a ring gear member, and the third member of the third planetary gear set is a sun gear member; and
  wherein the first member of the fourth planetary gear set is a carrier member, the second member of the fourth planetary gear set is a sun gear member, and the third member of the fourth planetary gear set is a ring gear member.

14. A powertrain for a vehicle having an engine and a transmission comprising:
  an input member;
  an output member;
  a stationary member;
  a first, a second, a third, and a fourth planetary gear set, each planetary gear set having a first, a second, and a third member; wherein the output member is connected for common rotation with the first member of the first planetary gear set;
  a first interconnecting member continuously connecting the second member of the first planetary gear set for common rotation with the first member of the second planetary gear set;
  a second interconnecting member continuously connecting the third member of the first planetary gear set for common rotation with the second member of the second planetary gear set;
  a third interconnecting member continuously connecting the third member of the second planetary gear set for common rotation with the first member of the third planetary gear set and the first member of the fourth planetary gear set;
  a fourth interconnecting member continuously connecting the second member of the third planetary gear set for common rotation with the second member of the fourth planetary gear set;
  six torque-transmitting mechanisms each of which is selectively engageable to connect a respective one of the members of the planetary gear sets with one of the input member, the stationary member, and another respective one of the members of the planetary gear sets;
  wherein a first of the six torque-transmitting mechanisms is selectively engageable to connect the second member of the first planetary gear set to the stationary member;
  wherein a second of the six torque-transmitting mechanisms is selectively engageable to connect the input member for common rotation with the second member of the third planetary gear set;
  wherein the first and the second of the six torque-transmitting mechanisms are selectable one-way clutches each configured to have two different selectable operating modes, each operating mode locking in one direction of relative rotation of different portions of the clutch and freewheeling in an opposing direction of relative rotation of the different portions of the clutch; and
  wherein the six torque-transmitting mechanisms are engaged in different combinations of three to establish at least eight forward speed ratios and a reverse speed ratio between the input member and the output member.

15. The transmission of claim 14, further comprising:
  a motor operatively connected to the input member;
  wherein the engine is stopped prior to engagement of either of the first or the second torque-transmitting mechanisms and the motor is used to restart the engine.

16. The transmission of claim 14, wherein a third of the six torque-transmitting mechanisms is selectively engageable to connect the third member of the third planetary gear set to the stationary member;
  wherein a fourth of the six torque-transmitting mechanisms is selectively engageable to connect the third member of the fourth planetary gear set to the stationary member;

wherein a fifth of the six torque-transmitting mechanisms is selectively engageable to connect the input member for common rotation with the third member of the third planetary gear set; and wherein a sixth of the six torque-transmitting mechanisms is selectively engageable to connect the input member for common rotation with the second member of the second planetary gear set.

17. The transmission of claim 16, wherein the third and the fourth torque-transmitting mechanisms are engaged and the first torque-transmitting mechanism is in the second mode to cause the input member to reduce to zero speed, and the second torque-transmitting mechanism is in the first mode after the input member is reduced to zero speed.

18. The transmission of claim 16, wherein the third, the fourth, and the fifth torque-transmitting mechanisms are engaged to cause the input member to reduce to zero speed, and the second torque-transmitting mechanism is in the first mode after the input member is reduced to zero speed.

19. The transmission of claim 14, wherein the first member of the first planetary gear set is a carrier member, the second member of the first planetary gear set is a sun gear member, and the third member of the first planetary gear set is a ring gear member;

wherein the first member of the second planetary gear set is a sun gear member, the second member of the second planetary gear set is a carrier member, and the third member of the second planetary gear set is a ring gear member;

wherein the first member of the third planetary gear set is a carrier member, the second member of the third planetary gear set is a ring gear member, and the third member of the third planetary gear set is a sun gear member; and wherein the first member of the fourth planetary gear set is a carrier member, the second member of the fourth planetary gear set is a sun gear member, and the third member of the fourth planetary gear set is a ring gear member.

20. A transmission for a vehicle comprising:
an input member;
an output member;
a stationary member;
a first, a second, a third, and a fourth planetary gear set, each planetary gear set having a first, a second, and a third member; wherein the output member is connected for common rotation with the first member of the first planetary gear set;

four interconnecting members continuously connecting different ones of the members of the planetary gear sets for common rotation;

six torque-transmitting mechanisms each of which is selectively engageable to connect a respective one of the members of the planetary gear sets with one of the input member, the stationary member, and another respective one of the members of the planetary gear sets;

wherein a first of the six torque-transmitting mechanisms is selectively engageable to connect the second member of the first planetary gear set to the stationary member;

wherein a second of the six torque-transmitting mechanisms is selectively engageable to connect the input member for common rotation with the second member of the third planetary gear set;

wherein at least one of the first and the second of the six torque-transmitting mechanisms is a selectable one-way clutch configured to have a first operating mode and a second operating mode, either of which modes may be selected; wherein the selectable one-way clutch engages when relative rotation of a first portion of the selectable one-way clutch to a second portion of the selectable one-way clutch is in a first direction in the first operating mode and freewheels when relative rotation of the first portion of the selectable one-way clutch to the second portion of the selectable one-way clutch is in an opposing second direction in the first operating mode; wherein the selectable one-way clutch engages when relative rotation of the first portion of the selectable one-way clutch to the second portion of the selectable one-way clutch is in the second direction in the first operating mode and freewheels when relative rotation of the first portion of the selectable one-way clutch to the second portion of the selectable one-way clutch in the first direction of rotation in the second operating mode; and wherein the six torque-transmitting mechanisms are engaged in different combinations of three to establish at least eight forward speed ratios and a reverse speed ratio between the input member and the output member.

* * * * *